United States Patent [19]

Gutfinger

[11] Patent Number: 5,542,030
[45] Date of Patent: Jul. 30, 1996

[54] SYSTEM AND METHOD FOR OPTIMIZING SURFACE PROJECTIONS DURING GENERATION OF FINITE ELEMENT REPRESENTATIONS OF OBJECTS

[75] Inventor: Ron S. Gutfinger, Seal Beach, Calif.

[73] Assignee: Electronic Data Systems Corporation, Plano, Tex.

[21] Appl. No.: 77,844

[22] Filed: Jun. 14, 1993

[51] Int. Cl.$^6$ .................................................. G06T 17/20
[52] U.S. Cl. ........................... 395/123; 395/119; 395/121
[58] Field of Search ................................. 395/119, 121, 395/123, 142

[56] References Cited

U.S. PATENT DOCUMENTS

| | | | |
|---|---|---|---|
| 4,620,287 | 10/1986 | Yam | 395/142 |
| 4,674,058 | 6/1987 | Lindbloom et al. | 395/141 |
| 4,933,889 | 6/1990 | Meshkat et al. | 364/578 |
| 4,941,114 | 7/1990 | Shigyo et al. | 364/578 |
| 5,189,626 | 2/1993 | Colburn | 364/474.24 |
| 5,214,752 | 5/1993 | Meshkat et al. | 395/123 |
| 5,309,521 | 5/1994 | Matsukawa | 382/22 |
| 5,315,537 | 5/1994 | Blacker | 364/570 |
| 5,345,490 | 9/1994 | Finnigan et al. | 378/4 |
| 5,345,546 | 9/1994 | Harada et al. | 395/142 |
| 5,363,479 | 11/1994 | Olynyk | 395/142 |
| 5,390,292 | 2/1995 | Takamura et al. | 395/120 |
| 5,440,674 | 8/1995 | Park | 395/123 |

OTHER PUBLICATIONS

Ferguson, James; "Multivariable Curve Interpolation"; Apr. 1964; pp. 221–228.
McCracken et al.; "Computing for Engineers and Scientists With Fortran 77"; 1988; pp. 220–228.
Foley et al.; "Computer Graphics: Principles and Practice", Second Edition; 1990; pp. 471–491, 507–514, 516–529.

Primary Examiner—Almis R. Jankus
Assistant Examiner—Jody R. Wingard
Attorney, Agent, or Firm—L. Joy Griebenow

[57] ABSTRACT

A system and method enabling computer meshing program to generate a finite element representation of an object is shown which receives problem definition variables relevant to the desired object, calls a projection control program to generate point surface projections based on such problem definition variables, and generates a finite element representation of the object based on the point surface projections received from the projection control program. The projection control program requests a projector to perform a point surface projection with a projector, and evaluates the point surface projection with respect to the problem definition variables to determine whether the projection was successful as well as to determine the projector's projection performance. The projection control program increments a plurality of diagnostic counters on the basis of the evaluation and updates a plurality of projection control switches on the basis of the diagnostic counter values. The preferred embodiment of the present invention maintains two projectors which the projection control program can alternate between based on the performance of the projectors and the particular problem variables presented. Whether a particular projector is disengaged is determined by the state of one of the projection control switches which state is affected by a combination of certain of the diagnostic counter values. Another of the projection control switches activates a guess search program. The projection controller activates the guess search program if the point projection was evaluated to be unsuccessful and no guess search was performed prior to the projection under evaluation.

22 Claims, 4 Drawing Sheets

SYSTEM AND METHOD FOR OPTIMIZING SURFACE PROJECTIONS DURING GENERATION OF FINITE ELEMENT REPRESENTATIONS OF OBJECTS

BACKGROUND OF THE INVENTION

1. Field of the Invention

The present invention relates generally to computer-aided design and engineering, and more particularly to a system and method for controlling and optimizing surface projections during generation of finite element representations of objects.

2. Description of Related Art

Finite element analysis is used to predict the behavior of a physical object under particular loading conditions. This is done by decomposing the object into geometrically simple objects, known as elements, whose behavior can be expressed in classical engineering equations. An element can be thought of as a set of nodes connected by element edges. For example, elements may be triangular, quadrilateral, tetrahedral, or of more complicated connectivity. By calculating the influence of each element upon its neighbors, an approximation of the physical behavior of the overall object can be made.

The task of deriving a model composed of elements, loading conditions, material properties, and behavior attributes which can represent the original object is called finite element modeling. Many interactive systems exist to aid in the definition of such finite element models from previously defined CAD models by generating a finite element mesh over the surface(s) of the object under scrutiny. Examples of mesh generators include mappings to parametric space or surface tessellation. Surface tessellation is a term that describes any method of subdividing an arbitrarily bounded region of an arbitrarily curved surface completely into elements, for example quadrilaterals.

Various methods and systems for finite element mesh generation or "meshing" are known which employ marching applications for generating point projections onto a given surface. Such programs generate a mesh by extracting element by element, while marching on a path in space, until the whole surface is meshed. "Marching" is used herein to refer to the construction of an extraction element along an inner edge of a node loop during the meshing operation. This construction is repeated as long as there is room for a good extraction element anywhere within the remaining mesh region. Thus, while the system is moving from place to place around the node loop, the system is considered to be marching. Marching programs are used in various fields of endeavor, including for example machining along surfaces, as well as finite element surface meshing (e.g. surface tessellation).

Obtaining the point projection is the most CPU intensive part of an marching program, accounting for as much as 90% of the CPU time. Moreover, most highly efficient projection programs require an initial (u,v) guess (e.g., Newton-Raphson projection). The success, quality, and speed of such projections depend on the quality of the initial guess. An initial guess may be found by testing distances between the point in space and a given set of points on the surface (referred to as a "guess search"). The parameters of the closest surface point may serve as the initial guess. Finding an initial guess when one is not needed to efficiently project a point is a further waste of CPU resources.

Until the present invention, a marching program would find a Cartesian point and then directly call a projection routine using the last (u,v) guess, or not, depending upon the marching program, to provide the next projected point. While there have been separate improvements on the marching programs as well as on projectors, there has been no consideration of optimizing the relationship between the marching program and the projector to thereby decrease CPU time and speed up finite element mesh generation.

SUMMARY OF THE INVENTION

In view of the above problems associated with the related art, it is an object of the present invention to provide a system and method for improved control and optimization of surface projections associated with the generation of finite element representations of objects.

It is another object of the present invention to provide a faster automatic mesh generator which decreases CPU time during mesh generation.

The system and method of the present invention maintain an optimal balance between use of the previously projected point as a projection guess and finding an initial guess which is CPU intensive. In addition, such system and method maintain optimal balance between use of a fast projection program that can experience possible failures (e.g., Newton-Raphson) and a backup projection program which is very slow and therefore CPU intensive, but always converges.

Specifically, the present invention enables a computer meshing program to generate a finite element representation of an object by receiving problem definition variables relevant to the desired object, calling a projection control program to generate point surface projections based on such problem definition variables, and generating a finite element representation of the object based on the point surface projections received from the projection control program. The projection control program receives the problem definition variables, requests a projector to perform a point surface projection with a projector, and evaluates the point surface projection with respect to the problem definition variables to determine whether the projection was successful as well as to determine the projector's projection performance. The projection control program increments a plurality of diagnostic counters on the basis of the evaluation and updates a plurality of projection control switches on the basis of the diagnostic counter values. This controller continues until a successful point surface projection is obtained and provided to the meshing program.

The preferred embodiment of the present invention maintains two projectors which the projection control program can alternate between based on the performance of the projectors and the particular problem variables presented. Whether a particular projector is disengaged is determined by the state of one of the projection control switches which state is affected by a combination of certain of the diagnostic counter values.

Another of the projection control switches activates a guess search program. The projection controller may activate the guess search program if the point projection was evaluated to be unsuccessful and no guess search was performed prior to the projection under evaluation.

The system and method of the invention thereby optimize the surface projections onto a given surface while marching on a path in space, and minimize the overall time to perform the projections by monitoring and evaluating each projection for its quality and the success of the projection. This then results in a faster march.

These and other features and advantages of the invention will be apparent to those skilled in the art from the following detailed description of preferred embodiments, taken together with the accompanying drawings, in which:

DETAILED DESCRIPTION OF THE PREFERRED EMBODIMENT

Figure 1A:
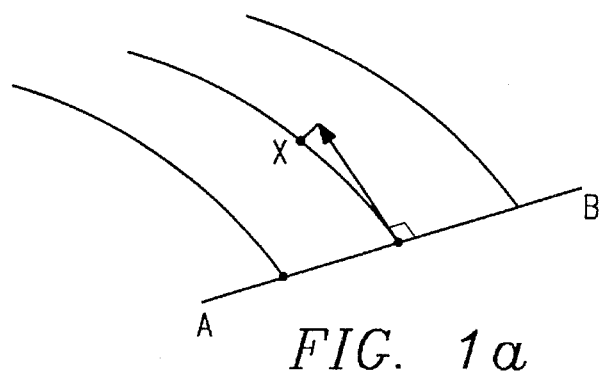
FIGS. 1a and 1b are illustrative drawings of quadrilateral edge construction.

In a CAD system which models solids, there exists a hierarchy of geometric entities, with objects at the highest level. Objects are assembled from individual solids which are in turn defined as a set of faces which completely enclose the solid. Solids may have cavities within them. Each face is then defined as a set of edge curves which completely enclosed the face, together with a surface representation for the interior of the face. Faces may have holes within them. Edge curves lie on the surface. Edges are then defined as bounded space curves. This is known as the boundary representation of the object.

While it should be understood that other meshing programs will work with and benefit from the present invention, for the sake of illustration, a quadrilateral tessellation meshing method will be discussed herein. Such a method starts with the definition of the boundary of the region to be meshed and creates a mesh on any face which occurs in such a region. The first step is to topologically simplify the boundary definition of the face. In other words, holes are joined to the boundary, and closed surfaces (such as cylinders and tori) are cut open. The boundary of the region to be meshed then becomes a single sequential list of edge curves which lies on the surface. The preparation of this list data structure is called boundary definition. Since the method is designed to produce quadrilaterals of a uniform size through the region to be meshed, the region may be divided up into subregions of varying mesh density if desired. Mesh density may be specified in terms of the desired length of quadrilateral edges within each subregion, which is not the same as the manual subdivision of a region into 4-sided patches. In its most streamlined case, the required input of the quadrilateral tessellation method consists only of the identification of a face ("surface"), and specification of the desired mesh density ("marching step" or "element size").

Many interactive techniques exist which can be utilized to subdivide a face into the desired mesh density subregions. From each subregion, a node loop is constructed. Nodes are automatically spaced along the edge curves of the region using various rules and heuristics depending upon the technique employed. Each node loop is processed through the steps known as extract quadrilaterals, triangulate, and combine triangles, until the area enclosed has been completely filled with quadrilaterals. A final smoothing step is normally applied to the mesh as a whole.

While the present invention will be discussed herein in connection with a marching program, it should nevertheless be understood that the present invention may also be used in connection with the projections required for the smoothing step. The system and method of the present invention affects the extraction step of a marching program to thereby increase the speed with which the node loop is processed. Extraction is the iterative definition and removal of a quadrilateral from a mesh region, and the subsequent modification of the node loop to enclose a diminished mesh region.

Figure 1B:
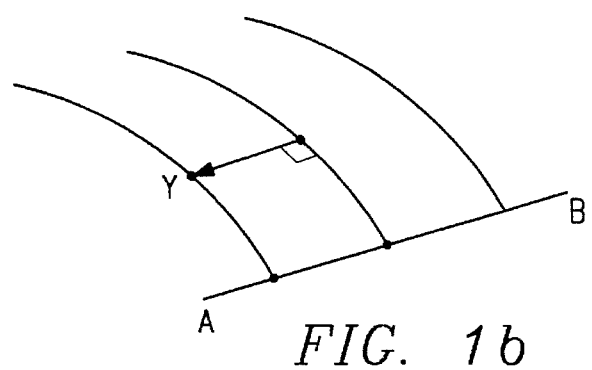

The primary extraction technique is the construction of a quadrilateral along an inner edge of the node loop. A drawing of such construction is shown in FIGS. 1a and 1b. Construction of a quadrilateral element is repeated as long as there is room for a good quadrilateral anywhere within the remaining mesh region. While moving around the node loop (also known as "marching"), a quadrilateral is proposed to the interior of the mesh region, using each successive pair of neighboring nodes. As seen in FIG. 1a, a quadrilateral edge, of the specified edge length, is constructed inwardly from an initial guess point (at the base of the vector), perpendicularly to edge AB and tangent to the surface, from the more forward of the pair of neighboring nodes. The resultant point lying at the tip of the vector is an input point that is provided to a projector, which generates the point surface projection or mesh point, node X. The nearest point actually on the surface to the interior end of the new edge is node X of the proposed extraction quadrilateral. Node X is known as the projection, or the projected point. The projected mesh point, node X, will be evaluated by the controller of the instant invention by examining certain parameters, including the distance between X and the input point and element size.

Similarly, as seen in FIG. 1b, final node Y is found by constructing another edge, of the specified edge length, perpendicular to the earlier constructed edge and tangent to the surface from the end of the previously constructed edge. The nearest point actually on the surface to the end of the new edge is also a node of the proposed extraction quadrilateral and is also part of the projection.

If both of the new nodes are found to lie on the interior of the node loop, the quadrilateral is considered approved, and is extracted from the mesh region. The node loop is then modified to exclude the area of the new quadrilateral from the mesh region.

A mesh generation program normally includes a marching program and a projection program or projector. According to the present invention, however, there is also a surface projections controller. In order to maximize the projector's efficiency, the complexity of the marching problem is evaluated. Such evaluation yields values for a set of problem definition variables (e.g. what type of surface (planar, conic, etc.), what is the nature of the surface (surface is trimmed, etc.), what is the march step (march step is large with respect to surface), etc.). Thus the surface projections controller examines the marching program problem as defined by the problem variables. Traditionally, the marching program calls the projection routine hundreds of times. However, according to the present invention, the marching program calls the controller which controls the projector and requests the projector to project a point. The controller then evaluates the point projection returned by the projector, and based on that evaluation, the controller will set and adjust control switches which will control the projector and the subsequent projections. While the system of the present invention initially checks the march step and the surface that is to be meshed, afterwards, the system just keeps projecting points and evaluating the projections, adjusting the control switches and projecting another point until the marching program no longer requests the controller to access the projector.

Figure 2:
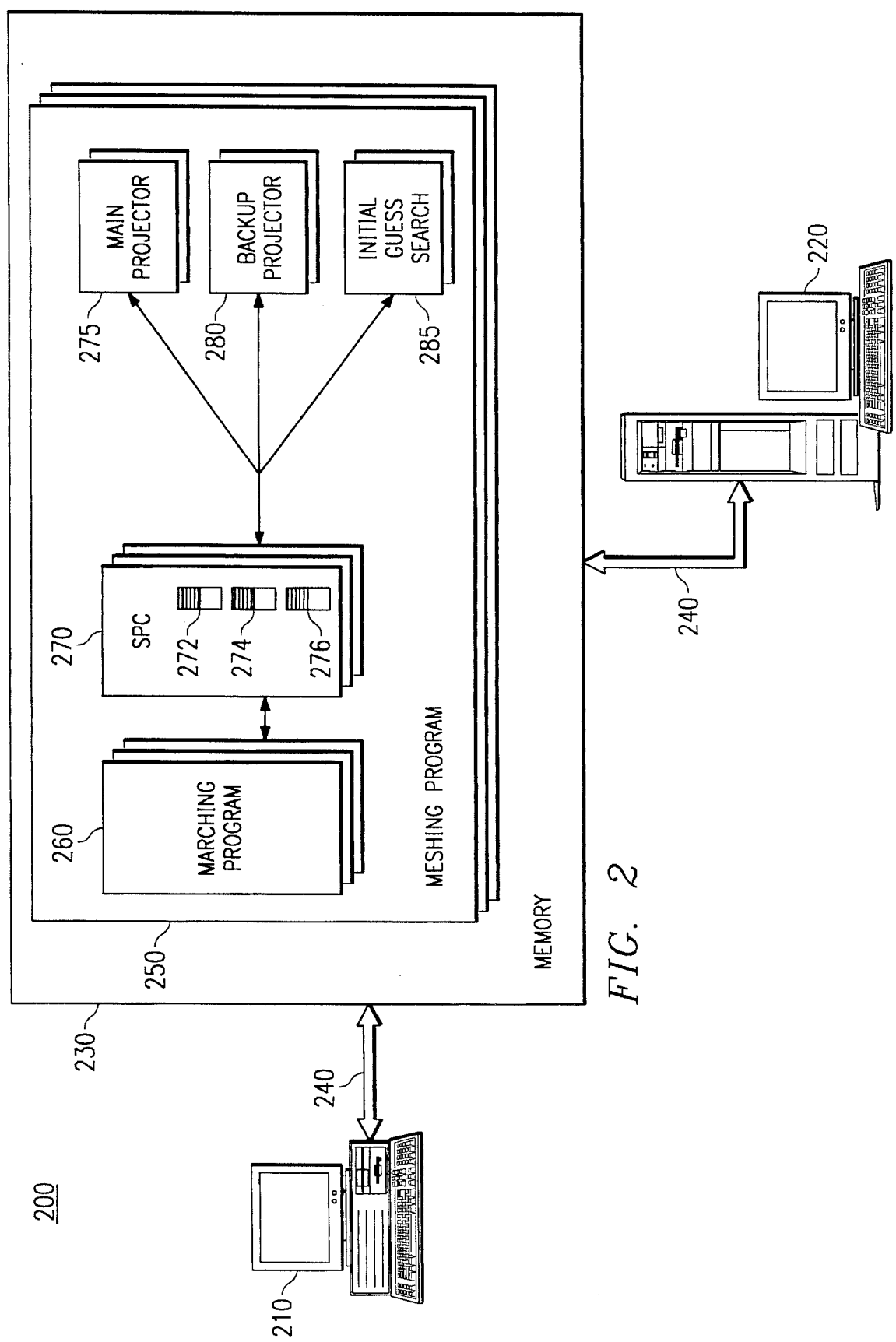
FIG. 2 is a schematic drawing of an example system employing the present invention.

Specifically, FIG. 2 shows a schematic drawing of an example processing system 200 employing the present invention. For the sake of discussion herein, system 200 is capable of meshing a desired object, and incorporates at least one workstation or client/server 210 and/or at least one mainframe computer 220. The exact composition of such workstation 210 and mainframe 220 are well-known and will not be described herein. There is a CAD system of the user's choice, such as are well-known in the art, residing on said workstation 210 and/or mainframe 220, depending upon the particular configuration of system 200. Such CAD system includes a meshing program 250.

A user picks a surface that is to be completely meshed via the CAD system, and tells the CAD system at what mesh density, or element size the user would like the system to mesh the selected surface. The CAD system directs system 200 to access memory 230 via bus 240 to reach meshing program 250.

Meshing program 250 takes a surface and an element size as its input and outputs a mesh over the selected surface—which mesh is a finite element representation of the geometry of the surface of the object. Various uses of the finite element representation (mesh) output will occur to those skilled in the art, including without limitation: electrical applications such as magnetics, mechanical applications such as stress analysis, vibration analysis or composite material analysis problems, or thermodynamics applications such as fluid flow, thermal analysis or heat transfer.

Meshing program 250 includes marching program 260, surface projection controller 270, projectors 275, 280, and initial guess search system 285. Meshing program 250 calls marching program 260, which in turn calls optimized projection controller 270. At this point, controller 270 is given the (x,y,z) coordinates of a point and possibly a (u,v) guess, and by optimally using main projector 275, backup projector 280 and/or initial guess system 285, as explained further below, controller 270 returns as output the (u,v) of a point projection and the (x,y,z) coordinates of that point which lies on the surface to be used by meshing program 250, and more particularly marching program 260, in generating a mesh over the selected surface of the desired object.

Controller 270 of the present invention controls how the search and projection processes—initial guess search 285, main projector use 275, and backup projector use 280—are utilized to affect the overall speed of projection and thereby optimize the amount of CPU time used. Processes 275, 280, 285 are existing programs ordinarily found in or associated with a mesh generation program and regularly called by marching program 260.

The general methods for iterative convergence techniques used in projectors, such as those of meshing program 250, consist of guessing a value, modeling the process, and calculating a new guessed value. The process is then repeated until the guessed and calculated values are equal within a certain tolerance, which is indicative of convergence to a projection point on the surface. The iterations can be implemented in various ways since there are at least four categories of methods for selecting the initial and subsequent guess: resubstitution, dichotomization, extrapolation and interpolation.

A preferred embodiment of the present invention includes two projectors: main projector 275 and backup projector 280. While any of the various convergence techniques will work in either projector, main projector 275 preferably employs a Newton-Raphson routine. Such a routine is considered fast, but does not always yield a successful point or node projection. Thus, sometimes such a projector will fail to give a answer, give a bad answer or even give no answer. Main projector 275 normally requires a point, (i.e., an $U_p V_p$ ((u,v) previous) initial guess) to find a new guess outside the interval. A (u,v) guess is the parametric value of coordinates on the surface, a starting guess to project the point from off the surface onto the surface.

On the other hand, backup projector 280 preferably employs a two-dimensional dichotomization projection method. This dichotomization method operates by bisection. Backup projector 280 grids the surface, finds the closest grid point to the projection point, and then grids the surface around that point. Backup projector 280 subdivides the surface again and again until it gets within a designated tolerance to the point. The main drawback to using this projector all of the time is that though it always converges, it is considerably slower and extremely CPU intensive. Controller 270 of the present invention maintains an optimal balance between using main projector 275 and backup projector 280, as well as the use of initial guess search system 285—with the intent to minimize the CPU time by setting the control switches and keeping track of the projection performance with the diagnostic counters. Therefore, as part of the meshing process which projects many points, the projection of previous points affects how the later points are projected by selectively using the main and back projectors, and the initial guess programs in response to the settings of the control switches and diagnostic counters. However, since initial guess search system 285 is very CPU intensive, it is undesirable to execute initial guess search system 285 for every single projection made by either main projector 275 or backup projector 280. By way of explanation, a marching program may use the previous (u,v) as a good guess to find the next (u,v). However, in some cases, such as when the march step is big relative to surface changes, as explained below in connection with Block 360 of FIG. 3, the previous (u,v) will not be a good guess. Therefore controller 270 will evaluate the march step with respect to problem variables such as surface changes and decide if using the last (u,v) is a good guess. Also, if the last (u,v) of a projection failed as a good guess, controller 270 will, depending upon the particular application, flip switch 272 to use the initial guess search system. Until the present invention, if a projector used the last (u,v) as a guess and the projection fails, the marching program would try to find a better guess and then directly request the projector to reproject the point. The time spent on using the bad guess (projecting and failing) is wasted CPU time. Moreover, when this is done repeatedly, then the projector ends up projecting twice for each successful projection (i.e., projecting unsuccessfully, finding a guess, and projecting again successfully). These first two steps will use considerable CPU time if done for each projection. However, by controller 270 of the present invention identifying this situation when it occurs (i.e., guesses are failing and therefore, requesting initial guess search system 285 to find a guess before the selected projector projects the next point), considerable CPU time is saved.

As is apparent, each point projection from the projector designated by controller 270 and used by mesh generation program 250 is monitored and evaluated by controller 270 of the present invention. The evaluation is used to update record and accumulate a projection performance history of past mesh points and a set of diagnostic counters. While it should be understood that the number and type of diagnostic counters employed are a matter of design choice, in a preferred embodiment of the invention, controller 270 preferably has a diagnostic counter (not shown) for the number of attempted projections (i.e., how many times did the selected projector try to project a point regardless of success). Furthermore, there is preferably a counter for the number of guess failures, one for the number of main projection failures (i.e., the number of times the main projector has failed), and a counter for range failures (i.e., the number of main projections outside the surface parameter range. The latter situation could include a case where the projector returned a successful projection, but the projected point is outside the surface range—a projection outside the area that is to be meshed.

The more basic diagnostic counters include the number of attempted projections, the number of guess failures, and the number of main projection failures. One may want more specialized counters like range failures or others that are specific to a desired application. Regardless of the type of diagnostic counters, controller 270 as depicted in FIG. 2 then turns selected control switches 272, 274, 276 ON or OFF depending on the values of the diagnostic counters, which values are user-defined and often application specific. These switches aid controller 270 in monitoring the projection process and controlling projector usage. Switches 272, 274, 276 are established by problem definition variables which are part of the problem definition as defined by the user via meshing program 250 of the CAD system. Examples of control variables include the surface type (e.g., the surface is planar, is trim, or is complex) and/or the specified element size (march step).

As with the diagnostic counters above, it should be understood that the number, name and type of control switches employed are a matter of design choice. However, in a preferred embodiment of the invention, the following are preferred control switches: search for an initial guess always, main projection program is disengaged, and perform extra diagnostic checks.

The criterion for setting the search for initial guess always control switch 272 is to take the number of guess failures and divide it by the number of attempted projections to thereby yield a percent failure. If, for example there is a 30% failure, that indicates the projector keeps using bad guesses. Depending upon the percentage threshold set for the particular application, controller 270 may turn on the "search always" switch. The percentage at which this control switch is activated is user- or application-determined.

The next control switch 274 is "main projection program is disengaged". Thus, if main projector 275 performs 100 projections, and for example, 80% of them failed, surface projection controller 270 of the present invention will disengage the main projector because too much CPU time is wasted on projecting and failing. Controller 270 decides it is more efficient to use backup projector 280 because for the particular problem (surface) before it, main projector 275 is experiencing great difficulties.

It should be realized that controller 270 may also decide to reengage main projector 275. This would occur, for example, where meshing program 250 is projecting along an edge, thereby requiring different evaluation and perhaps a selection of a different projector for more efficient meshing.

Control switch 276 for "perform extra diagnostic checks" determines whether any diagnostic checks are to be performed. For example, meshing program 250 is called upon to mesh a trivial surface, such as a plane. To project a point over onto a plane is considered a trivial projection, and even a Newton-Raphson projector will have 100% success rate. In this particular example, controller 270 directs marching program 260 and projectors 275, 280 to not perform any diagnostic checks and updates. Thus, evaluating the projection on the basis of the particular marching problem, controller 270 according to the present invention thereby affects the control of the projection to improve the response of the marching program.

While the above control switches are good basic switches, another control switch could be "engage grid search for guess". For example, if marching program 260 is addressing a complex surface using very large elements (marching step), the system should engage the search for guess always every time before it makes a projection, because otherwise the projector will always fail.

Figure 3:
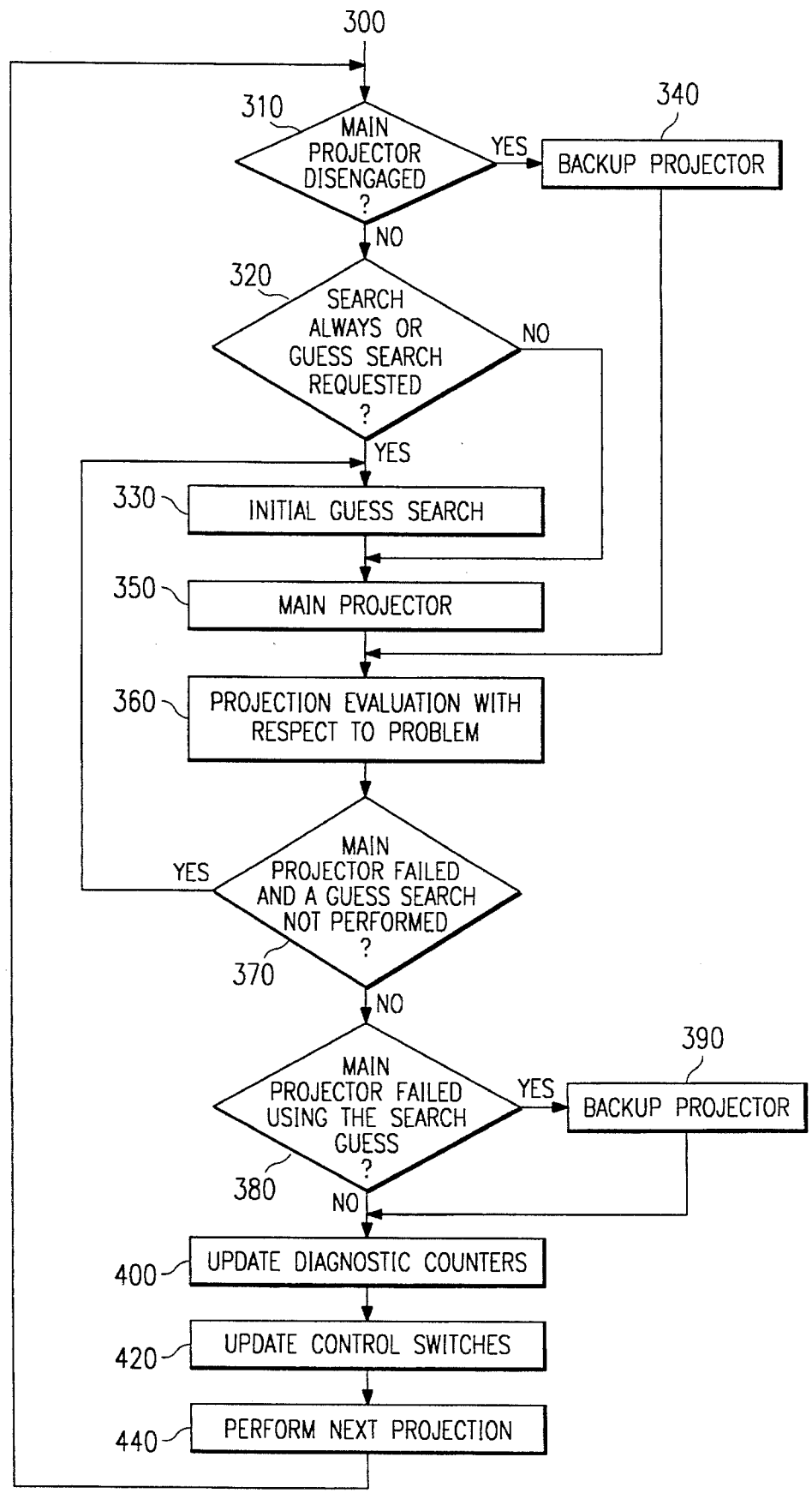
FIG. 3 is a flowchart of a preferred embodiment of the present invention.

Consider now FIG. 3 which is a flowchart of a preferred embodiment of the present invention. Input 300 to the controller is a Cartesian point (x,y,z), and possibly a (u,v) guess from the marching program. At Block 310, the controller checks the state of the main projector. If the main projector has been disengaged, the meshing program is no longer projecting points using the main projection convergence technique, and is instead directed to Block 340 to use the backup projection convergence technique.

If the main projector is engaged, at Block 320 the controller checks whether the initial guess always control switch 272 is on or whether a guess search has been requested. Initial guess always control switch 272, when on means that every time a projection is made, an initial guess search is done at Block 330. Thus, no matter what the system had as a previous guess, that previous guess will be ignored and an initial guess search will be performed (which is CPU intensive).

"Guess search requested" is an input request and occurs when the marching program calls the projection routine without a guess. As the marching program proceeds it usually has a guess, but there are exceptions, such as the first march because there is no initial guess. Another exception occurs when there are voids at the end of a march. In this latter situation the projector may project without having any guesses. Thus, if this request is activated, the projector is required to search for a guess before projecting a point.

Thus, at decision Block 320, the controller checks whether there was an initial guess available for the projector to use. If there is, then the projector will use it; if not, then the controller will ask for a new one to be determined by requesting the guess search subroutine to be executed at Block 330.

At Block 350 the controller calls the main projection routine to perform a point or node projection. Subsequently, at Block 360, the controller evaluates the projection with respect to the problem, and decides whether to accept the projection as successful. The evaluation focuses on how close the projected point came to the input point (see FIG. 1a), and on the relative sizes of the march steps or elements as compared with the how the object surface changes. These methods are discussed below.

One example of such evaluation occurring at Block 360 is when the main projector has failed, but it provided an answer. In this situation, the projector failed to meet the high tolerance known as convergence tolerance. Nevertheless, the projector provided an answer and, based on the problem definition variables (also referred to as problem definition information) from the marching program, the controller evaluates the answer. For example, if the projection is within a radius of 5%–10% of the element size or the march step, for meshing purposes, the point projection is considered sufficiently accurate. Thus, even though the projection has a high tolerance, for example $10^{-8}$ inches$^2$, and the projection program hasn't converged to that extremely high level of convergence, controller 270 may accept the answer as a successful point projection.

Another evaluation which controller 270 performs at Block 360 is size of the march step or element relative to surface changes. As discussed above in connection with initial guess search system 285, in such a situation, the previous (u,v) will probably not be a good guess. Therefore controller 270 will evaluate the march step with respect to problem variables such as surface changes and decide if using the last (u,v) is a good guess. This occurs when a projection has failed and no guess search was performed. Now, even though it failed, the projection yields a point, which is some non-zero answer and could even be the guess point. If the user has defined a small element size for mesh generation program 250, the large element or coarse mesh criterion described below has been met, and the projection will be considered successful. Thus, even though the projection has failed, since the elements are so small even using the last step (guess) is sufficient, and controller 270 will decide the projection is to be considered successful.

One of the advantages achieved by the present invention is evaluation and control of system surface projections. A system lacking the controller of the present invention would perform projections the same way each time without regard to any change in the element size (marching step size). However, with the controller of the present invention, on a given surface using a certain element size, it may mesh the surface using a particular mix of main and backup projection techniques, including guess (grid) searches. Then, if the improved meshing system is called upon to mesh the same surface again using a larger element size, the controller will use a different mix of projectors and search system. This is because the behavior of the meshing program will be different, so that projections should be evaluated differently based on the problem control variables.

In making the evaluations described above, and others, controller 270 evaluates the projections with respect to criteria. Controller 270 calculates the distance between the projected point, node X (FIG. 1a), and the input point at the tip of the vector as seen in FIG. 1a. Controller 270 then checks whether the calculated distance is greater than a critical distance; if not, the projection is considered successful and the controller falls through to Block 400 to increment the relevant diagnostic counters.

However, if the calculated distance is greater than the critical distance, controller 270 considers the projection unsuccessful and may re-evaluate the success of the projection by focusing on the element size with respect to surface changes. Thus, if the projection failed, the system did not do a guess search, and if the elements were small, the controller accepts the projection as successful and proceeds to Block 400. Furthermore, if the projection failed, the system did not do a guess search and the elements were large, but the distance was sufficiently small, the controller again accepts the projection as successful and proceeds to Block 400. Thus the controller according to the present invention evaluates a failed projection with respect to the projector and with respect to the marching program.

Once the controller deems the projection to be ultimately unsuccessful or successful, it proceeds to Block 370. As noted above, if the projection was successful, controller 270 falls through to Block 400. However, if the projection was unsuccessful the controller must decide whether the system performed a guess search. If the system had performed a guess search before the main projector generated the failed projection under consideration, controller 270 proceeds to Block 390 via decision Block 380 (main projector failed using search guess), requests execution of the backup projection convergence technique and then proceeds to Block 400 where controller 270 increments the (u,v) fails counter (i.e., indicating the (u,v) used as a guess has failed). If, on the other hand, the projection ultimately failed and no guess search was performed, controller 270 returns to Block 330 to call initial guess search 285 to find an (u,v) guess, and proceeds to Block 350 where it requests the projector project a point again based on the guess found during the search. At this point controller 270 returns to Block 360 and calculates the distance between the point projection returned by the projector and the guess again. Calculating a distance is an ingredient for the evaluation of criterion affecting which diagnostic counters will be incremented in Block 400 and, therefore, which switches will be reset by controller 270 in Block 420.

Thus, in Block 360, the controller determines whether failed means definitely failed, or in some applications, for example the radius situation or marching step vs. surface variations situation, a failed projection may be reevaluated and considered a successful projection. Thus, at Block 360, the current projector (275 or 280) interacts with marching program 260 via controller 270. Problem control variables of the marching problem are used to evaluate whether the projection was successful. Traditionally, this evaluation is not present; the marching program would just directly call the projection routine, and either get an answer or not. However, with the present invention, controller 270 evaluates the projection answer with respect to the overall process of the marching problem, thereby permitting interaction between the two process systems and optimizing CPU utilization as well as decrease mesh generation time.

Node Projection Optimizations

As indicated above, the system and method of the present invention maintain an optimal balance of using grid tests vs. using (u,v) guesses (e.g. the last meshed node (u,v) may serve as a guess to project the current node) and of using the main—Newton projector vs. the backup projector. The invention monitors the projector based on those diagnostic variables selected by the user, based on the results of a variety of diagnostic counters. The projector's operation in subsequent projections is managed by control switches.

According to the preferred embodiment of the present invention, the system and method described herein is monitored and evaluated using the following diagnostic counters:

1. Ntrys - number of attempted projections
2. UV_fails - number of failed (u,v) guesses (the guess is used as a start point in the projection program)
3. NTN_fails - number of Newton projection failures. This counter reflects the number of main projector failures. In the present invention, the main projection program uses a Newton-Raphson program, thus the "NTN". A more generalized counter name could be "MAIN_PROJECTOR_fails", for example.
4. NTN_range - number of Newton projections outside of the surface's (u,v) range. It should be understood that a successful projection but outside the (u,v) range is considered a failed projection for the purpose of meshing). Again, another generalized design choice for this counter's name might be "MAIN_PROJECTOR_range", for example.

The following switches control the various operations which the projection routine performs:

1. NTN_off - Newton projection is OFF (i.e., disengaged; the backup program will be used). This switch's name can also be generalized to be "MAIN_PROJECTOR_off", for example.
2. Grid_always - each time a projection is made find a grid guess.
3. trim_surf - surface is trimmed (i.e., the surface has holes in it). Although not a switch, if this problem definition variable is TRUE, (u,v) range failures will be considered for Newton disengagement and NTN_off will be executed. If the surface is untrimmed, (u,v) range failures are ignored for the purpose of disengagement.
4. Diagnose - perform diagnostic checks. This switch is also toggled based on relevant problem definition variables.

Preferably a failed Newton projection is resolved by using the backup dichotomization projector.

For complex surfaces extra diagnostics are performed, in order to monitor the program and ensure the quality of the projections. For example, if the diagnose mode is ON, the controller increments the number of tries, and checks the percentage failures, and other controls, adjusting switches accordingly. The criterion for determining whether the diagnose mode is ON or OFF is as follows. If the surface is a plane, cylinder, cone, sphere, or a B-surface having a maximal degree of 2 (in U or V), the diagnostic switch, and thereby the diagnose mode is OFF. Otherwise, the surface is considered complex and the diagnostic switch (and diagnose mode) is ON.

One problem definition variable is the coarse mesh criterion. If the element size is small relatively to the surface changes there is no need to find (u,v) guesses using a grid guess (the element spacing is equal to or smaller than the grid spacing). On the other hand, when running a coarse mesh (large element size=large marching step) using the last meshed node as a guess may result in a projection failure that must be resolved by finding a grid guess and re-projecting the node to the surface. In other words, if the system has a relatively large element and the surface is rapidly changing across the distance, then it would be wiser not to use the last (u,v).

For example, when meshing planar surfaces, the Newton-Raphson projection never fails since the derivative of a plane is constant. Consequently, using the last meshed node as a guess is sufficient. However, for other surfaces, the critical element size is defined by:

$$crit\_Esize = 0.9 * dim\_crit/n\_max$$

where
   dim crit= the smallest dimension of the surface box (if the box is very thin (d3<d2/10), sheet-like, the 2nd smallest dimension is used)
   n_max= max(Ncu, Ncv)
   NC - number of control points Thus, if the element size is greater than the critical element size, a Newton projection failure will result in re-projecting the node using a grid guess.

A further problem definition variable used in the projection evaluation stage is the critical distance criterion. For initial mesh creation purposes, the projection need not be very accurate (e.g. 10xe−10). On this basis, a failed Newton projection within a critical distance from the node the system is attempting to project will be considered a successful projection. Since the initial mesh will be smoothed, this inaccurate value will be considerably improved.

Figure 5:
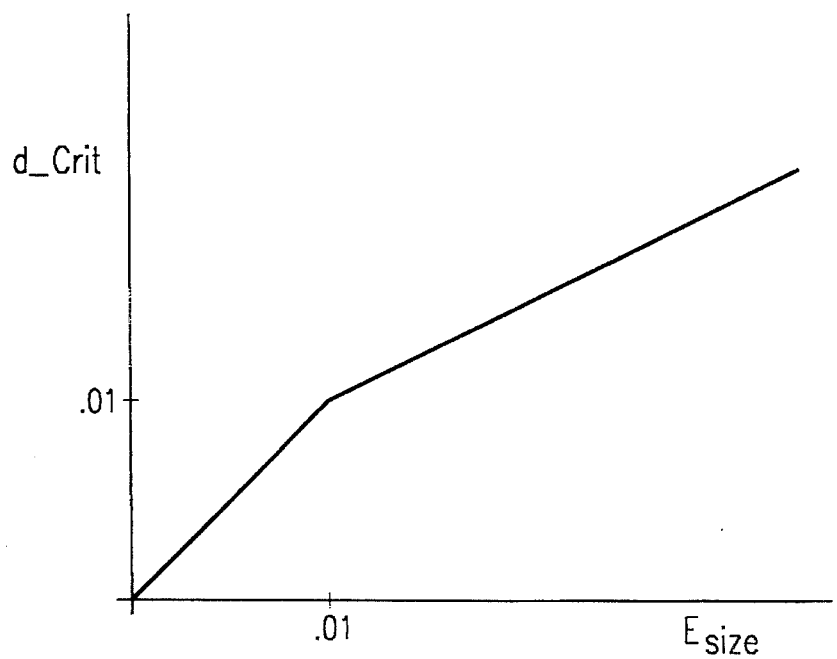
FIG. 5 depicts a graph of critical distance values as a function of the element size for a critical distance criterion of the present invention.

The critical distance (d_crit) is defined as follows:

if (element_size > 0.01 inch)
        d_crit = 0.09 + 0.1 * element size
    else
        d_crit = element size FIG. 5 depicts such critical distance values as a function of the element size. As can be seen from the drawing, when the element size is less than 0.01 inch, the critical distance is considered equivalent to the element size. Otherwise, d_crit is set at 0.09 inch plus ten percent (10%) of the element size.

Once the controller has completed its evaluation of the projection at Block 360, it determines in Block 370 whether the main projector failed without using a search guess. If this is the case, the system will return to Block 330, find an appropriate guess and then return to Block 350 to project again, this time based on the guess. Otherwise, if the main projector has failed and a search guess was used OR the main projector has succeeded (i.e., a successful projection), then the controller proceeds to Block 380.

Now, at Block 380, if the projection failed and a guess was used during the projection, the controller ended up with no usable answer. The controller then resorts to using the backup projector at Block 390. Therefore, at Block 400, regardless of whether the projection failed with a guess or the projection succeeded, the controller updates the appropriate diagnostic counters.

Figure 4:
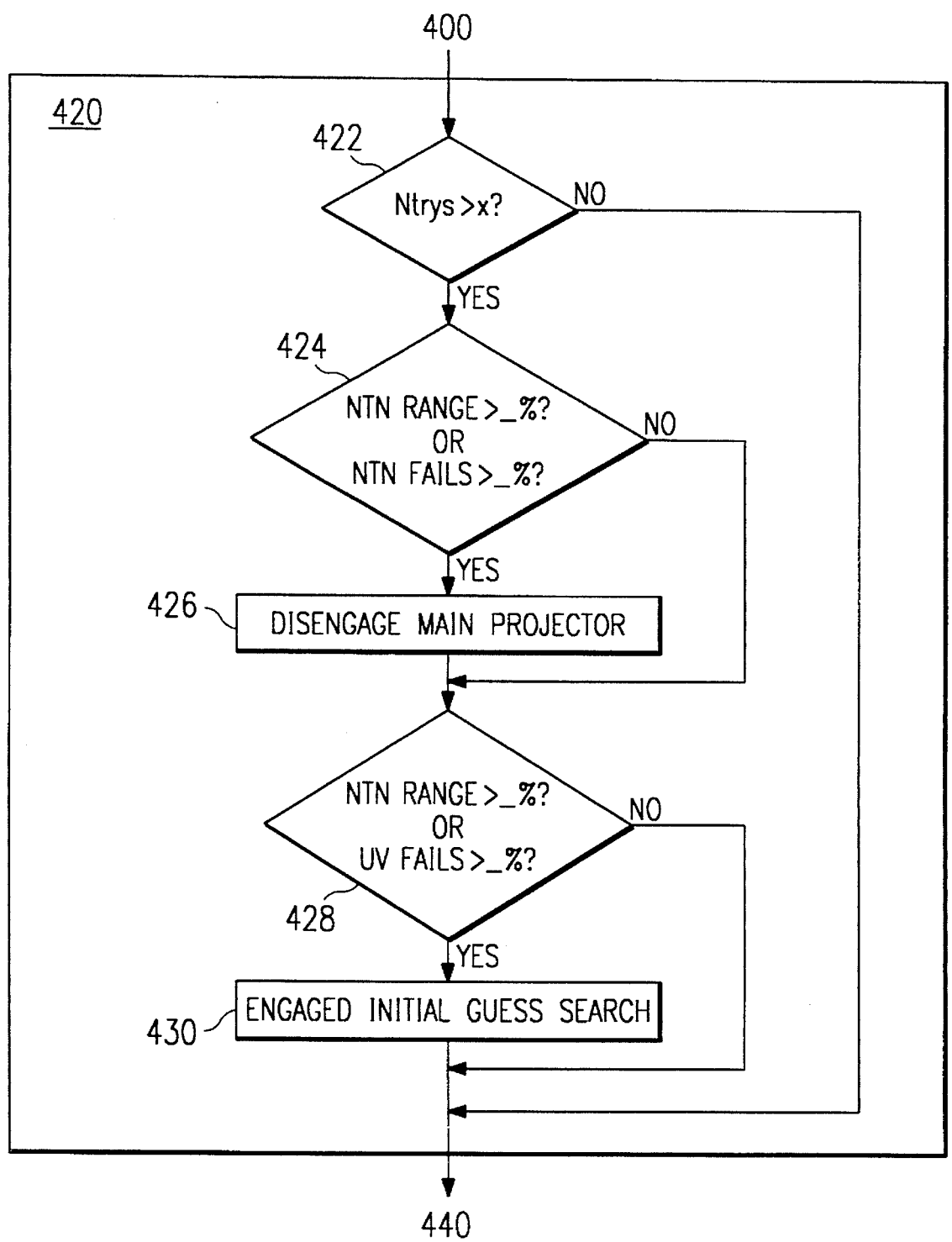
FIG. 4 is a more detailed flowchart of the update control switches portion of the flowchart of FIG. 3.

Consider at this point FIG. 4, which shows pseudocode for Block 420 of FIG. 3, namely updating of the control switches according to a preferred embodiment of the present invention. The controller has just completed incrementing the relevant diagnostic counters in Block 400 and proceeds to evaluate the output of the counters in light of the problem control variables. At decision Block 422, the controller determines whether the number of projection tries is greater than a predetermined threshold. If not, the controller proceeds promptly to Block 440 where it outputs the cartesian coordinates and probably a (u,v) (depending on the marching program) of the point projection and proceeds to perform the next projection requested of it by the marching program. However, if the number of projection tries is greater than the predetermined threshold, the controller then (decision Block 424) determines whether the number of range fails by the main projector is greater than a predetermined percent or whether the number of failures by the main projector is greater than a predetermined percent. If the answer is positive, the controller disengages the main projector and engages the backup projector as more efficient usage of CPU time than the main projector. If the answer to decision Block 424 is negative, the controller leaves the control switch for disengaging the main projector alone and proceeds to decision Block 428. At this point the controller considers whether the number of main projector range failures is greater than a predetermined percent or whether the number of projections failures involving a (u,v) guess is greater than a predetermined percent. If the answer is positive, the controller toggles the engage initial guess search control switch (Block 420) and proceeds to Block 440 (of FIG. 3). If the answer to decision Block 428 is negative, then the controller proceeds directly Block 440 where it outputs the cartesian coordinates and probably a (u,v) of the point projection and proceeds to perform the next projection requested of it by the marching program.

Returning now to FIG. 3, as alluded to above in the preferred embodiment, at Block 400, the controller always increments the diagnostic counter for the number of projection tries. Then, depending on whether the projection of the main projector failed, the controller increments the number of main projector failures. If the projection has failed, the controller then checks whether the projector used the last (u,v) as a guess; if so, the controller increments the number of (u,v) fails. The controller also considers whether a successful projection was outside the surface range (boundaries of the surface). If it was, the controller increments the counter reflecting number of (u,v) range failures.

After all of the relevant diagnostic counters are incremented, the controller proceeds to Block 420 where it updates the relevant control switches. As discussed above, the controller considers various criteria for adjusting the relevant control switches depending on the results of various combinations of counters.

By way of example and as described in connection with FIG. 4, the controller checks whether the number of range failures is greater than a certain threshold or the percentage of main projector failures is high with respect to the number of tries. If so, the controller disengages the main projector by toggling control switch 274 (FIG. 2). Therefore, as part of the meshing process which projects many points, the projection of previous points affects how the later points are projected by selectively using the main and back projectors, and the initial guess programs in response to the settings of the control switches and diagnostic counters. Furthermore, if the number of range failures is greater than a predetermined percentage, or the number of last guess is greater than a percentage, the controller turns ON the initial guess search control switch 272 (FIG. 2).

The program listing (found in Appendix A) demonstrates an embodiment of the invention contained therein. It should be understood by those skilled in the art that such is provided only by way of illustrative example and should in no manner be construed to limit the invention as described herein. Numerous modifications and alternate embodiments of the invention will occur to those skilled in the art. Accordingly, it is intended that the invention be limited only in terms of the following claims:

I claim:

1. A method for a computer to optimize the generation of a finite element representation of surfaces of an object, wherein said computer uses a meshing program and at least two projectors, comprising the steps of:

receiving problem definition variables relevant to said object including surface definition and critical distance;

calling a projection control program to generate mesh points based on such problem definition variables, wherein said mesh point generation further comprising:

a) receiving said problem definition variables;

b) projecting a mesh point with a first projector using an iterative convergence process, said iterative convergence process concluding either by reaching an iteration upper limit or a convergence limit;

c) evaluating said projected mesh point with respect to said surface definition, and critical distance, to determine whether said first projector was successful in projecting a good mesh point;

c.1) projecting said mesh point with a second projector on the basis of said problem definition variables evaluation in step c) indicating said first projector failed to project a good mesh point;

d) incrementing a plurality of diagnostic counters on the basis of said problem definition variables evaluation in step c) and recording said first projector's performance history of past mesh point projections;

e) updating a setting or resetting state of a plurality of projection control switches on the basis of the values of said diagnostic counters;

e.1) disengaging said first projector so that said second projector is used to project subsequent mesh points when said first projector's performance falls below a predetermined threshold as determined on the basis of the state of at least one of said projection control switches, said second projector having more certainty in projecting good mesh points than said first projector;

f) providing said good mesh point to said meshing program;

repeating steps a) through f) for projecting subsequent mesh points while using said second projector in step b) and skipping step e,1) if said first projector has been disengaged until said meshing program stops requesting another mesh point; and generating a finite element representation of said object from a plurality of said good mesh points received from said projection control program.

2. The method for a computer to optimize the generation of a finite element representation of claim 1, wherein said first projector employs a Newton-Raphson method in said iterative convergence process for projecting said mesh point.

3. The method for a computer to optimize the generation of a finite element representation of claim 1, wherein said second projector employs a dichotomization convergence method in projecting said mesh point.

4. The method for a computer to optimize the generation of a finite element representation of claim 1 wherein said (c) step of evaluating said mesh point further comprises the steps of:

computing a distance between said mesh point projection and an input point provided to said first projector for projecting said mesh point said input point being off the surface of the object;

comparing said computed distance with said critical distance;

determining said mesh point projection to be good if the computed distance is less than or equal to said critical distance; and determining said mesh point projection to not be good if the computed distance is greater than said critical distance.

5. The method for a computer to optimize the generation of a finite element representation of claim 4 wherein said problem definition variables further include element size and object surface information, wherein said object surface information includes changes in said object surfaces, and wherein said step of evaluating said mesh point projection further comprises the steps of:

if said mesh point projection is not good, re-evaluate said projection by:

comparing the element size to changes in said object surface;

determining said mesh point projection to not be good if the element size is large relative to said object surface changes; and determining said mesh point projection to be good if the element size is small relative to said object surface changes.

6. The method for a computer to generate a finite element representation of claim 5, further comprising the step of determining said mesh point projection to be successful if the element size is evaluated to be small but the distance between said mesh point projection and said input point is smaller than the critical distance.

7. The method for a computer to optimize the generation of a finite element representation of claim 1 wherein said step of updating said projection control switches further comprises the step of:

generating an initial guess point in response to the state of at least one of said projection control switches if said mesh point projection was evaluated to not be good and no such guess point was generated prior to said step of performing said mesh point projection.

8. The method for a computer to optimize the generation of a finite element representation of claim 1 wherein said step of receiving problem definition variables further comprises the step of:

receiving coordinates of a point on a surface of said object.

9. A method for a computer to optimize the generation of mesh points requested by a mesh generation program for generating a finite element representation of surfaces of an object, comprising the steps of:

a) receiving problem definition variables including surface definition and critical distance from said mesh generating program;

b) projecting a mesh point on a surface with a first projector;

c) evaluating said mesh point with respect to said problem definition variables to determine whether said projection was successful;

c.1) generating said mesh point using a second projector on the basis of said evaluation indicating said first projector was unsuccessful in generating said mesh point;

d) incrementing a plurality of diagnostic counters on the basis of said evaluation in step c) and recording said first projector's performance history of past mesh point projections;

e) updating a setting or resetting state of a plurality of projector control switches on the basis of values on said diagnostic counters;

e.1) disengaging said first projector so that said second projector is used to project subsequent mesh points when said first projector's performance falls below a predetermined threshold as determined on the basis of the state of at least one of said projection control switches;

f) providing said successful mesh point to said mesh generation program; and repeating steps a) through f) while using said second projector in step b) and skipping step e.1) if said first projector has been disengaged until said mesh generation program stops requesting mesh points.

10. The method for a computer to optimize the generation of mesh points of claim 9, wherein said first projector employs a Newton-Raphson method for projecting said mesh point.

11. The method for a computer to optimize the generation of mesh points of claim 9, wherein said second projector employs a dichotomization convergence method for projecting said mesh point.

12. The method for a computer to optimize the generation of mesh points of claim 9 wherein said step of evaluating said mesh point further comprises the steps of:

determining a distance between said mesh point projection and a known point, said known point being an input point to said first projector off said object surface;

comparing said distance with said critical distance;

determining said mesh point projection to be good if the computed distance is less than or equal to said critical distance; and determining said mesh point projection to not be good if the computed distance is greater than said critical distance.

13. The method for a computer to optimize the generation of mesh points of claim 9 wherein said problem definition variables further include object surface information and element size, wherein said object surface information includes changes in said object surfaces, and wherein said step of evaluating said mesh point further comprises the steps of:

comparing the element size to changes in said object surface;

determining said mesh point projection to not be good if the element size is large relative to said object surface changes; and determining said mesh point projection to be good if the element size is small relative to said object surface changes.

14. The method for a computer to optimize the generation of mesh points of claim 9 wherein said step of updating said projection control switches further comprises the step of:

guess searching to generate an initial guess point in response to the state of at least one of said projection control switches if said mesh point projected by said first projector was evaluated to be unsuccessful and no guess search was performed prior to said step of projecting said mesh point.

15. The method for a computer to optimize the generation of mesh points of claim 9 wherein said step of receiving problem definition variables further comprises the step of:

receiving coordinates of a point on a surface of said object.

16. A computer-aided design system for generating a finite element mesh representation of an object, wherein said computer-aided design system resides in a processor, comprising:

a mesh generation program for receiving problem definition information including surface definition and critical distance, and for requesting projections of surface points as said mesh generating program proceeds to generate a mesh across the surface of said object;

a first projector for projecting a plurality of node points;

a second projector for projecting said plurality of node points when said first projector has been disengaged; and an optimizing projection controller for receiving said projection requests from said mesh generating program, requesting said first projector to perform said requested projection until said first projector is performing below a predetermined threshold and is disengaged by said optimizing projection controller, requesting said second projector to perform said requested projection when said first projector has been disengaged, evaluating said requested projection of said first or second projector based on said problem definition information and that projector's projection performance of past node point projections.

17. The computer-aided design system of claim 16, wherein said problem definition information include user-defined surface information and element size.

18. The computer-aided design system of claim 16, wherein said optimizing projection controller further comprises projector control switches.

19. The computer-aided design system of claim 18, wherein said optimizing projection controller further comprises diagnostic counters.

20. The computer-aided design system of claim 19, wherein said optimizing projection controller updates said projector control switches based on a predetermined combination of count values of said diagnostic counters.

21. The computer-aided design system of claim 18, wherein one of said projector control switches disengages said first projector.

22. The computer-aided design system of claim 18, further comprising a guess search routine, wherein one of said projector control switches engages said guess search routine for generating a guess point ok the surface of the object to be used during said point surface projection.

* * * * *